United States Patent [19]
Lewis

[11] Patent Number: 5,627,684
[45] Date of Patent: May 6, 1997

[54] METHOD OF MANUFACTURING A LENS SYSTEM INSENSITIVE TO ASPHERIC DECENTERING AND A LENS SYSTEM MANUFACTURED THEREBY

[75] Inventor: Alan E. Lewis, Rochester, N.Y.

[73] Assignee: Eastman Kodak Company, Rochester, N.Y.

[21] Appl. No.: 430,982

[22] Filed: Apr. 28, 1995

[51] Int. Cl.$^6$ .............................. G02B 3/02; G05B 13/02
[52] U.S. Cl. .......................... 359/717; 364/148; 364/156
[58] Field of Search ........................... 359/717; 364/148, 364/156

[56] References Cited

U.S. PATENT DOCUMENTS

| | | | |
|---|---|---|---|
| 3,006,248 | 10/1961 | Linke et al. | 354/202 |
| 4,443,067 | 4/1984 | Owen, Jr. et al. | 359/675 |
| 4,932,764 | 6/1990 | Simpson, Jr. | 359/725 |
| 5,000,552 | 3/1991 | Simpson, Jr. et al. | 359/740 |
| 5,067,067 | 11/1991 | Estelle et al. | 364/156 |
| 5,067,803 | 11/1991 | Ohno | 359/708 |
| 5,166,830 | 11/1992 | Ishibai et al. | 359/717 |
| 5,327,291 | 7/1994 | Baker et al. | 359/716 |

OTHER PUBLICATIONS

Irving, Bruce R., "*A Technical Overview of CODE V Version 7*" SPIE vol. 766 (Computer Lens Design Workshop—1987) pp. 285–293.

Optical Research Associates, "*CODE V*" *Reference Manual;* Optical Research Associates, 3280 E. Foothill Blvd., Pasadena, Ca. 91107; Nov. 1987; 27 pages.

Rimmer, Matthew P., "*A Tolerancing Proceedure Based on MTF*", Optical Research Associates, Pasedena, California 91107 (Presented at SPIE—Aug. 28–29, 1978); 7 pages.

"CODE V Designer's Reference Manual", 1983, Optical Research Associates, pp. Auto–17 and Auto–18 (Optimization Section).

*Primary Examiner*—Georgia Y. Epps
*Assistant Examiner*—Evelyn A. Lester
*Attorney, Agent, or Firm*—Svetlana Z. Short

[57] ABSTRACT

Manufacturing of a desensitized lens system including: i) providing a starting point lens design having a plurality of aspheric surfaces; ii) decentering the design parameters of one of the aspheric surfaces; iii) optimizing the lens design with a decentered aspheric surface parameter by utilizing both positive and negative field rays to come up with optimum parameters for aspheric surfaces; iv) dropping the decenter out when the optimization is complete to obtain the nominal lens system parameters.

10 Claims, 11 Drawing Sheets

METHOD OF MANUFACTURING A LENS SYSTEM INSENSITIVE TO ASPHERIC DECENTERING AND A LENS SYSTEM MANUFACTURED THEREBY

CROSS REFERENCE TO RELATED APPLICATIONS

This application is related to U.S. patent application Ser. No. 08/427,552, filed Apr. 24, 1995, entitled A TWO ELEMENT OPTICAL SYSTEM, A CAMERA USING IT AND METHOD OF MAKING THE CAMERA, filed in the name of Alan E. Lewis.

BACKGROUND OF THE INVENTION

1. Field of the Invention

This invention relates to lens systems having aspheric surfaces and a method for making such a lens system.

2. Description of the Prior Art

Because the use of aspheric surfaces improves optical performance of the lens system, the use of these surfaces is often a key to achieving the desired optical performance. This is especially true when the lens system has fewer lens elements—such as the lens system designed for use in single-use cameras. For example, U.S. Pat. Nos. 5,067,803 and 5,327,291 show the use of aspheric surfaces in such lens systems.

U.S. Pat. No. 5,067,803 discloses a two-element lens system for use in photographic cameras. This patent also uses two meniscus lens elements arranged around a central aperture stop. The disclosed lens system utilizes a single aspheric surface on either one or both of the lens elements.

U.S. Pat. No. 5,327,291 also discloses a two component objective lens system. The disclosed lens system utilizes a single aspheric surface on each of the two lens elements.

But, aspheric surfaces typically have a strong drawback when compared with spherical surfaces. That is, the lens components with aspheric surfaces are usually sensitive to decentering of the aspheric surface. When multiple aspheric surfaces are present in a lens system, tilts and/or decenterization of these aspheric surfaces with respect to one another and with respect to the rest of the lens system often introduces undesirable aberrations into the lens system and thus degrades the overall optical performance of the lens system. Therefore, lens components with aspheric surfaces often have to be assembled to very strict tolerances. This makes the lens assembly difficult and drives up the cost of the lens system.

It is advantageous for camera objectives (i.e., taking lenses) to have a wide-angle, fast lens system with a superior performance. Thus, notwithstanding the variety of objective lens systems which have been previously proposed, there still exists a need for lens systems with a plurality of aspheric surfaces which are not sensitive to aspheric decentering and which can be produced at low cost.

Applicant's invention addresses this need and represents a further improvement in lens systems having aspheric surfaces and especially in lens systems having biaspheric lens components.

SUMMARY OF THE INVENTION

I disclosed a use of a biaspheric component in a lens system in U.S. patent application Ser. No. 08/427,552, filed Apr. 24, 1995, entitled A TWO ELEMENT OPTICAL SYSTEM, A CAMERA USING IT AND METHOD OF MAKING THE CAMERA. Such biaspheric components are often sensitive to decentering of the aspheric surface.

An object of the present invention is to provide a method of manufacturing a lens system which has been desensitized to an aspheric surface decentering.

Another object of the present invention is to produce an improved lens system having aspheric surfaces which are not sensitive to decenter.

Yet, another object of the present invention is to produce an improved lens system having a biaspheric lens component which is not sensitive to aspheric decenter.

These and other objects of the present invention are met by a method of manufacturing of a desensitized lens system including: i) providing a starting point lens design having a plurality of aspheric surfaces; ii) decentering the design parameters of one of the said aspheric surfaces; iii) optimizing the lens design with a decentered aspheric surface parameter by utilizing both positive and negative field rays to come up with optimum parameters for aspheric surfaces; iv) dropping the decenter out when the optimization is complete to obtain the nominal lens system parameters; and v) manufacturing the lens system according to said nominal lens system parameters.

According to the preferred embodiments of the present invention, an optical system manufactured by this method has a plurality of aspheric surfaces (for example, a biaspheric lens component) and has a reduced sensitivity to an aspheric surface decentering.

With the preferred embodiments of the invention, the following and other advantages are realized.

It is an advantage of the present invention that the lens system has a significantly improved optical performance while simultaneously being desensitized to an aspheric surface decenter.

It is another advantage of the present invention that biaspheric lens components or lens systems with the biaspheric lens components can be manufactured without tight tolerance on the aspheric surface tilt or aspheric surface decenter and then such lens systems can be made at less cost.

BRIEF DESCRIPTION OF THE DRAWINGS

Several embodiments of the present invention with now be described, by way of example, with reference to the accompanying drawings, in which.

DETAILED DESCRIPTION OF THE INVENTION

Figure 1:
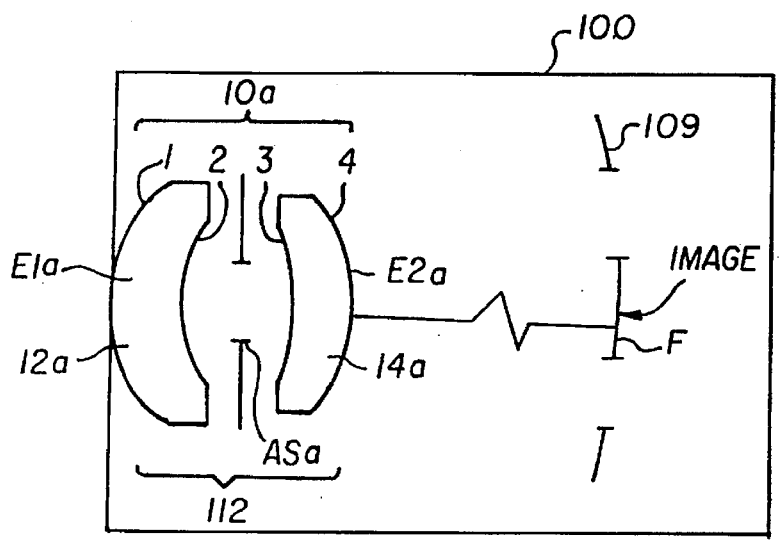
FIG. 1 shows the outline of the lens system 10a of a first preferred embodiment.

Typically, a lens system is designed with field angles covering only half of the image because of lens symmetry (from axis to one edge of the image). For a cylindrical film format, one can choose the best fit spherical radius to the corner of the cylinder format for the image surface in the design. The best fit sphere is defined herein as the sphere that intersects the cylinder on axis and at the corner. (However, in this specification, the film radius described for the preferred embodiments is the actual cylinder radius, not the best fit corner radius used to do the design.)

A lens system with a biaspheric lens element is usually difficult to manufacture due to the sensitivity of the lens system to the displacement of one of the aspheric surfaces of such a lens element relative to the other surface. Typically, a decenter Δ of 0.025 mm, which is a reasonable molding tolerance, causes a noticeable loss in MTF (Modulation Transfer Function) in the image as you move away from the axis. Molding to tighter tolerances increases the cost of the element.

A desensitizing procedure was used to design the first, second, and third lens system embodiments described further down in the specification. A programmed digital computer was used to design a lens system insensitive to aspheric decenters. More specifically, a lens design program having the means for optimizing lens systems with aspheric surfaces and also having the means for decentering such surfaces was utilized in this procedure. The method of the present invention was implemented on an IBM compatible PC 486 using CODE V. CODE V is a commercial lens design program available from ORA (Optical Research Associates, Inc.) from Pasadena, Calif.

Specifically, the embodiments include a two component lens system having at least one biaspheric lens component or lens element. A decenter of 0.025 mm was inserted during the lens design procedure on the first (i.e. front-most) surface of the biaspheric lens component. That is, the aspheric surface design parameters were purposely decentered. All other surfaces were centered on a common axis (i.e. 0.025 mm from where the first biaspheric surface is decentered to). The lens design program was used to optimize the lens system with the decentered (i.e. not nominal) parameters for the particular aspheric surface. To optimize with the assumed manufacturing decenter (or tolerance), one must trace rays over the whole image, that is, plus and minus field angles.

For the embodiments 1, 2 and 3, axis, ±30% field, ±70% field, and ±100% field were used for optimization. In addition, ±50% field was used to optimize embodiments 2 and 3 and additionally, ±90% field was used to optimize the embodiment 3. When the design program reaches a solution, it balances the performance of the upper and lower fields so that when the decenter in the design is removed, the undecentered solution is still good.

Tables 1–3, notes 3, document the performance of the desensitized embodiments.

For the first embodiment, which was desensitized for biaspheric sensitivity as described above, the 71% field heterochromatic MTF performance went from 65/74 (sagittal/tangential) at 12.5 lines per millimeter to 60/72 (sagittal/tangential) with a +0.025 mm decenter and 69/58 (sagittal/tangential) with a −0.025 mm decenter. This is much less MTF image degradation than a typical undesensitized lens would produce. The heterochromatic wavelength weights used are 546 nm/50, 440 nm/15, and 650 nm/35.

For the second embodiment, which is also desensitized for biaspheric sensitivity as described above, the 71% field heterochromatic MTF performance went from 70/75 (sagittal/tangential) at 12.5 lines per millimeter to 67/73 (sagittal/tangential) for a +0.025 mm decenter and 72/69 (sagittal/tangential) for a −0.025 mm decenter, again this is much less than the degradation produced by a regularly designed and manufactured lens system.

Similar performance was also achieved for the third embodiment (note 3, Table 3).

The improvement at the edge of the field is even more dramatic (in tables 1–3).

When optimizing, designing or analyzing a lens system with a desensitized biaspheric element, one can use a decenter in only one direction and trace both positive and negative field angle rays. On the other hand, an equivalent procedure can also be used—i.e. one can also create two "zoom" positions (which have the same focal length) by assigning a positive decenter value to one "zoom" position and a negative decenter value to the other "zoom" position and trace field angle rays in just one direction. Although, in design, one could require two "zoom" positions to accommodate the desired decenter value for a specific aspheric surface, for example, a +0.025 mm and a −0.025 mm decenter, doing the design as stated above with just one zoom position and tracing both positive and negative field rays is simpler. It should be noted that there is no need to optimize a lens system with a zoom position corresponding to a nominal position of the aspheric surface (i.e. zero decenter of the aspheric surface for the particular lens component). It is preferred that the optimization proceeds without the aspheric surface of this lens component being in a nominal position because the optimization routine is likely to struggle between optimizing the lens system performance in the nominal position vs. the lens system performance when an aspheric surface is decentered.

To summarize the steps recommended to manufacture a desensitized biaspheric plastic lens element:

1. Provide a good solution (i.e. a good starting point lens design) which is not desensitized to aspheric decenter (i.e. obtain a very good starting point lens design which is not desensitized to aspheric decenter);
2. Decenter the parameters of one of the aspheric surfaces of the biaspheric lens element or lens component (first surface, for example) in one dimension, such as the Y plane (or meridional plane);
3. Require an optimization that traces both positive and negative field rays emanating from the appropriate axis (Y axis if Y decenter is being used) at infinity but filling the entire stop aperture (X, Y plane) (The optimization should be done within the purposefully decentered aspheric surface parameters of the above-mentioned aspheric surface and not with the nominal lens system). The program will optimize the lens system, balancing these bundles of rays against each other (i.e. it tries to get equal image quality in plus and minus bundles) while it comes up with optimum parameters for the aspheric surfaces. A typical lens design program will try to control astigmatism, field curvature, spherical aberration, as well as other aberrations. An equivalent optimization method may also be used;
4. Drop the decenter out and the lens design is complete;
5. Obtain new, nominal lens system parameters; and Manufacture the lens system according to these new nominal lens system parameters.

Without a desensitizing procedure, similar to the one discussed above, the biaspheric lens element is difficult to make. Quality control especially would make it much more expensive to produce.

It is to be understood that the above-described method for desensitizing the aspheric surfaces is not restricted to the particular examples shown herein. For example, a lens system having a plurality of aspheric surfaces can be desensitized by decentering the surface parameters of the most sensitive aspheric surface and by optimizing the lens system with these decentered aspheric surface parameters. If more than one aspheric surface needs to be made less sensitive to the aspheric surface decenter, a lens system can be set up as a zoom lens system, where each zoom position is the same as the other zoom position with an exception that each of these contains one (different) decentered aspheric surface, and then optimizing this so called "zoom" lens system as described in step 3 above.

The following examples of the present invention consist of an optical system (also called a lens system) 10a–10c for an objective or taking lens 112 imaging an object on photographic film frame F of the film 109 for use in an inexpensive camera such as single lens camera 100. The camera 100 includes other known structures or means for advancing the film and a shutter for enabling an exposure of the film frame F to capture an image of the scene to be photographed. The exemplary optical system (or the lens system) $10_k$ comprises two lens components $12_k$ and $14_k$, and a shutter $S_k$, disposed between the two lens components at the aperture stop location. However, the above-described method is not limited to a two-component lens system. It can be used for any lens system which utilizes a biaspheric lens element. The subscript "k" identifies the $k^{th}$ embodiment of the present invention. The Photonics Dictionary (1981) defines a shutter as "a mechanical or automatic device used in a camera to control the time in which a light sensitive material is exposed to radiation." This device is usually an aperture hole and a shutter blade which covers and uncovers the aperture. With this type of shutter, if the shutter is located close to the aperture stop location, the exposure on the film is held uniform.

The front lens component $12_k$ of the optical system $10_k$ is a meniscus plastic lens element $E_{1k}$ having a concave surface oriented towards the aperture stop (shutter). The rear lens component $14_k$ is a meniscus plastic lens element $E_{2k}$. It also has a concave surface oriented towards the aperture stop. The front lens component $12_k$ may or may not have a longer focal length than the rear lens component $14_k$. Lens system $10_k$ deviates from a perfectly symmetrical type in that the two lens components $12_k$ and $14_k$ are not identical. More specifically, the focal lengths of the two lens components are significantly different from one another and at least one of the two lens components is biaspheric. If only one biaspheric lens component is used, its focal length is typically (but not always) greater than that of the other lens component. The aperture stop $AS_k$ is located between the two lens elements or on one of the internal lens surfaces.

The biaspheric lens components of these embodiments have a greatly reduced sensitivity to the aspheric surface decenter.

The first embodiment is illustrated in FIG. 1. It has a greatly reduced sensitivity to aspheric surface decenter. Its specific parameters are provided in Table 1.

The front lens component 12a of the optical system 10a is a meniscus plastic lens element $E_{1a}$. The rear lens component 14a is a meniscus plastic lens element $E_{2a}$. The front lens component 12a is biaspheric. The aperture stop ASa is located in the airspaced formed between the first lens element $E_{1a}$ and the second lens element $E_{2a}$. In this first embodiment, the focal length of optical system 10a is 24mm, the F-number is 8 and the full field of view is 71.7 degrees. Both of lens elements $E_{1a}$ and $E_{2a}$ of the first embodiment are positive and are made from the same type of plastic.

In this first embodiment, the lens components 12a and 14a have the thickness of 2.85 mm and 2.0 mm respectively. The focal length $f_{1a}$ of the first lens component 12a is 081.01 mm and the focal length $f_{2a}$ of the second lens component 14a is 26.84 mm. The ratio of $f_{1a}/f_{2a}=3.02$.

The image surface of the lens system 10a is cylindrical with a sag in the long dimension of the image. In this embodiment, this cylindrical radius of curvature is −90 mm.

Aspheric surfaces with about 143 waves and 48 waves (where λ=632.8 nm) maximum departure from the best fit sphere, are used on the first and the second surfaces, respectively, of the biaspheric lens element to control the image quality. The best fit sphere in this case is a sphere that intersects the asphere on axis and at 100% of clear aperture.

The ratio of the total length TL of the lens system (measuring from the front-most surface's vertex to the image plane) to the effective focal length (EFL) of the lens system is 1.22.

The aberration curves illustrating the performance of the optical system of the first preferred embodiment are provided in FIGS. 2A–2F.

Figure 2A:
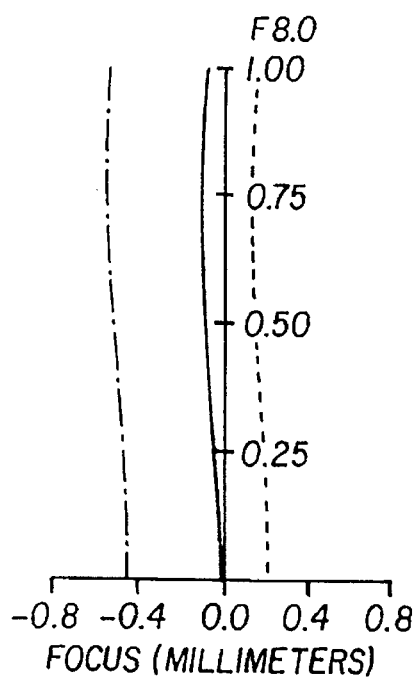
FIGS. 2A-2F provide aberration curves for the lens system 10a illustrated in FIG. 1.

More specifically, FIG. 2A illustrates longitudinal spherical aberration. The vertical axis depicts relative aperture. The horizontal axis depicts the focus position. The primary wavelength is 546.1 nm.

Figure 2B:
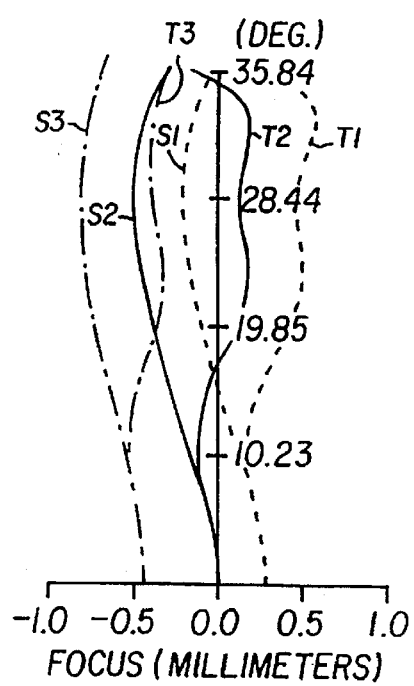

FIG. 2B illustrates astigmatism in the lens system. The vertical axis is the half field angle in degrees. The horizontal axis is focus position.

The "zero focus" on the horizontal axis of the longitudinal spherical aberration (LSA) and astigmatism plots (FIGS. 2A and 2B) is shown referenced to the paraxial focus at 546.1 nm. Since the image is cylindrically curved, we choose to reference the vertical axis of the astigmatism plot to an average curvature of the image format. For simplicity, we choose the best fit radius to the corner of the image format for our reference. For this first embodiment, the shape of the image format (16.7×30 mm) gives us a multiplying factor of 1.3099 for the best fit radius to the corner of the format. Using this with the −90 mm cylinder radius, we get a best fit corner radius of −117.89 mm. This is the best image radius to use for analysis since it is easy to define and is an average radius over the cylindrical format. More specifically, the multiplying factor for the best fit corner radius to a cylindrical image format may be calculated using the following procedure.

Calculate the angle θ between the horizontal and the diagonal of the image format. Here, θ=arctan (16.7/30) or 29.103 degrees. The multiplying factor that gives the approximate best fit corner radius for the cylinder is $1/[\cos^2(\theta)]$, which in this case is 1.3099.

Use of this average image radius (best fit corner radius) eliminates much of the difficulty in analyzing image quality over a cylindrical format. The curvature of the cylinder varies between the vertical (where the image is flat) and the longer horizontal dimension where it is curved the most, and it is in the corner where the maximum field is imaged. All of the aberrations shown which are dependent on field are referenced to this best fit radius.

Figure 2C:
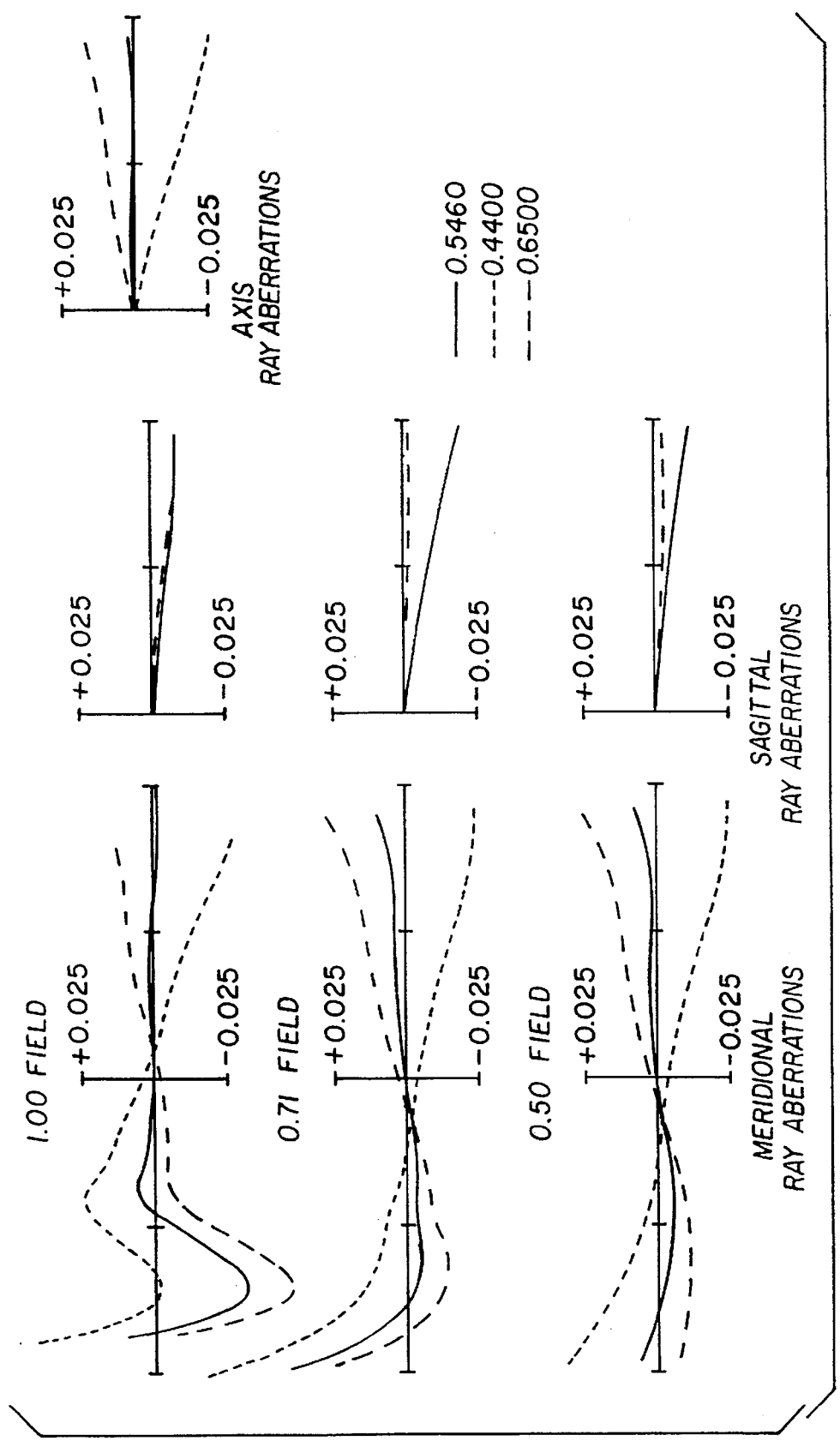

FIG. 2C depicts ray intercept curves for the first embodiment at several relative field positions (i.e. axis, 0.5, 0.7, and full field). The vertical axis depicts my aberrations in millimeters. The horizontal axis is relative pupil coordinate, the edges being ±full pupil (i.e. ±1.0 pupil).

Figure 2D:
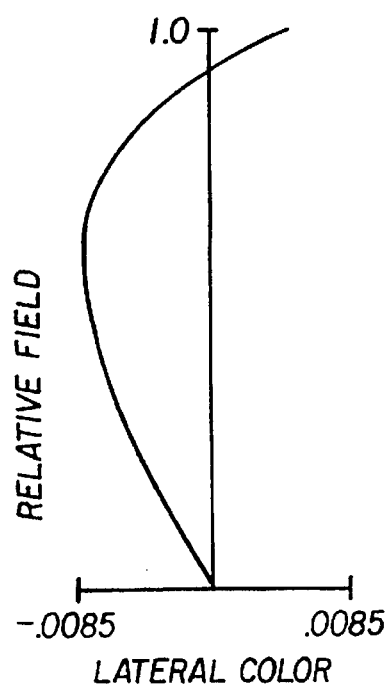

FIG. 2D depicts the lateral color (440 nm to 650 nm) across the field.

Figure 2E:
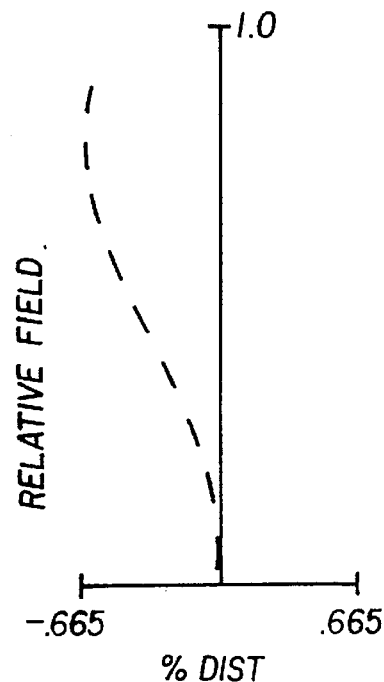

FIG. 2E depicts the distortion at the primary wavelength (546.1 nm) across the field. The distortion definition used here is:

[(principal real ray height on best fit image curve)–(paraxial principal ray height on the plane which is tangent to the best fit image curve on axis (i.e. at the vertex of this curve))]÷[paraxial ray height on the plane which is tangent to the best fit image curve on axis].

For calculating the percent distortion, we merely multiply this quantity by 100. Note that different optical design and analysis programs define distortion on curved images differently, but this definition is one of the several definitions commonly used.

Figure 2F:
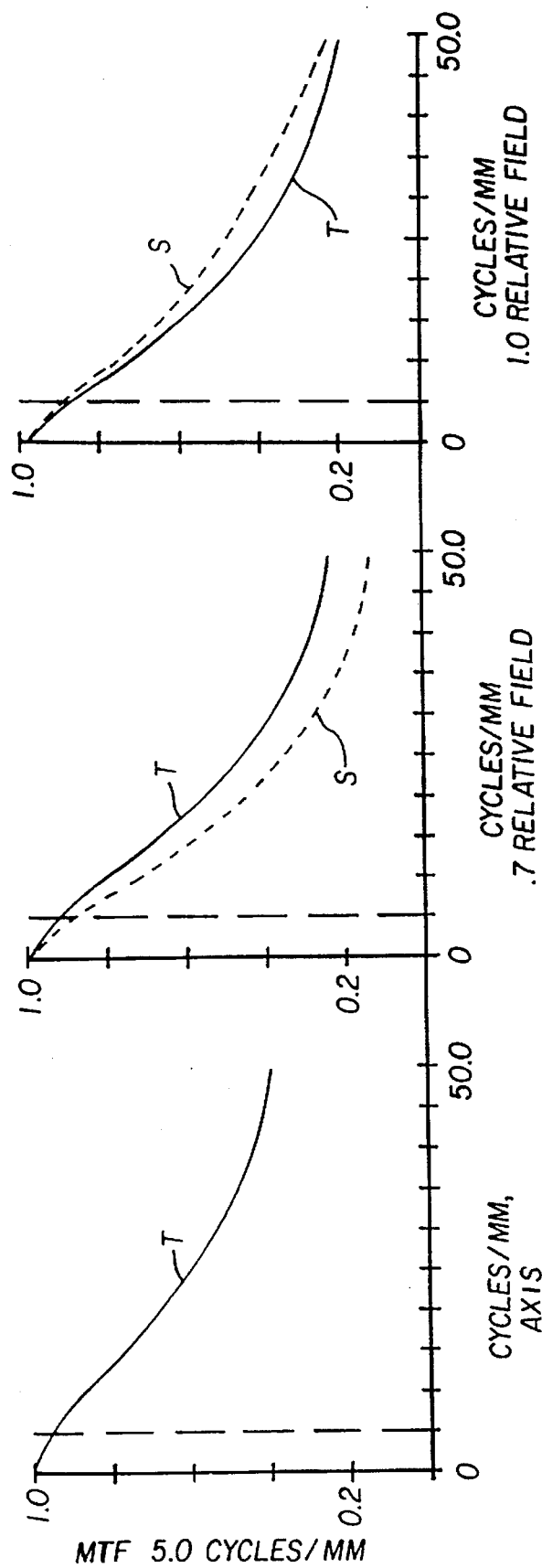

FIG. 2F depicts heterochromatic through frequency MTF at three field points: axis, 0.7 relative field, and full field. Wavelengths used were 650 nm, 546.1 nm, and 440 nm with respective chromatic weights of 35, 50, and 15.

Figure 3:
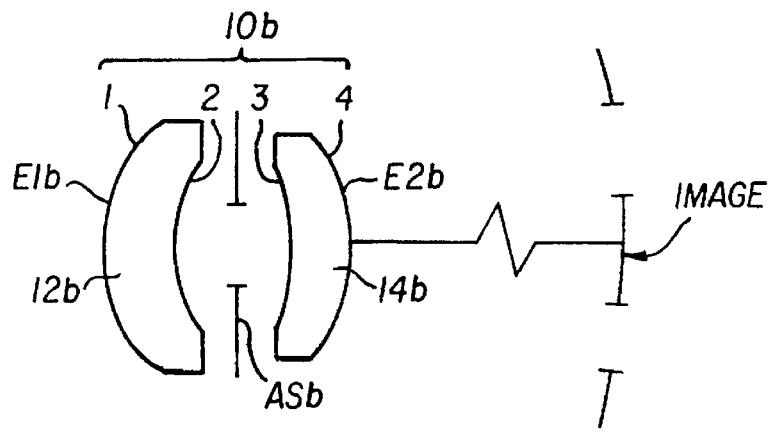
FIG. 3 shows the outline of the lens system 10b of a second preferred embodiment.

The second preferred embodiment is illustrated in FIG. 3. The optical system 10b of the second embodiment is constructed from two lens components 12b and 14b. The front lens component 12b is a meniscus plastic lens element $E_{1b}$. The rear lens component 14b is a meniscus plastic lens element $E_{2b}$. This embodiment is different from the above-described embodiment. It contains not two, but three aspheric surfaces, and it is the second and not the first lens component that is biaspheric. The front lens element $E_{1b}$ contains a single aspheric surface which is located on a front-most (i.e., object side) surface of the lens element. The second lens element $E_{2b}$ is biaspheric. The front lens component 12b has a shorter focal length than the rear lens component 14b. In the second embodiment, the focal length of optical system 10b is 24 mm, the F-number is 8 and the full field of view is 70.3 degrees. Lens components 12b and 14b are made from different types of plastic.

In this second embodiment, the lens components 12b and 14b have the thickness of 2.85 mm and 2.5 mm respectively. The focal length $f_{1b}$ of the first lens component 12b is 22.28 mm and the focal length $f_{2b}$ of the second lens component 14b is 220.14 mm. The ratio of $f_{1b}/f_{2b}=0.10$.

An aspheric surface with about 18 waves departure from the best fit sphere is used on the front surface of lens element $E_{1b}$.

Aspheric surfaces with about 52 waves and 123 waves departure from the best fit sphere, are used on the first and the second surfaces, respectively, of the biaspheric lens element $E_{2b}$ to control the image quality.

The ratio of the total length TL of the lens system (measuring from the front-most surface's vertex to the image plane) to the effective focal length (EFL) of the lens system is 1.08.

The aberration curves illustrating the performance of the optical system of the second embodiment are provided in FIGS. 4A–4F.

Figure 4D:
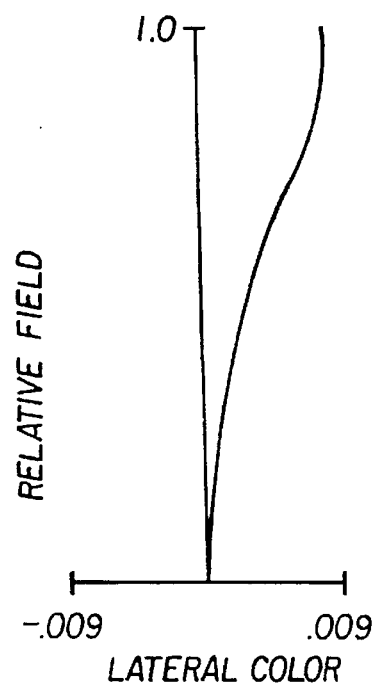
FIGS. 4A-4F provide aberration curves for the lens system 10b illustrated in FIG. 3.
Figure 4E:
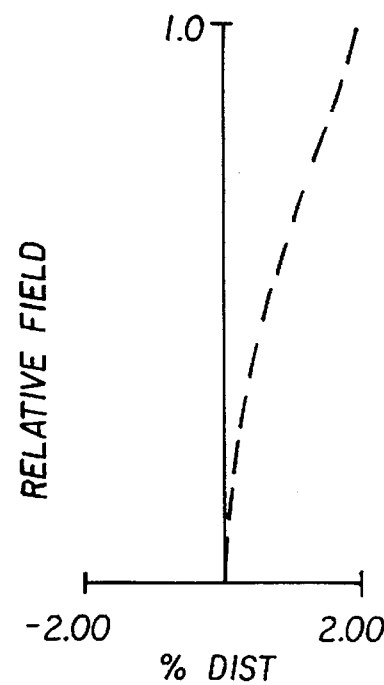
Figure 4A:
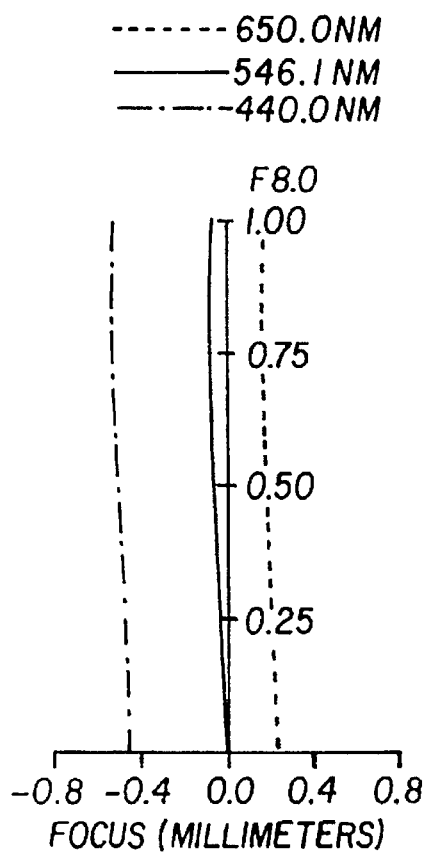

More specifically, FIG. 4A illustrates longitudinal spherical aberration. The vertical axis depicts relative aperture. The horizontal axis depicts the focus position. The primary wavelength is 546.1 nm.

Figure 4B:
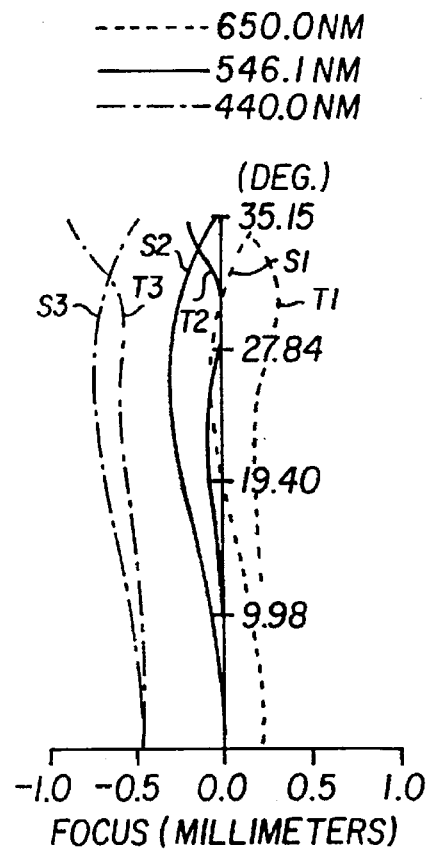

FIG. 4B illustrates astigmatism in the lens system. The vertical axis is the half field angle in degrees. The horizontal axis is focus position.

The "zero focus" on the horizontal axis of the longitudinal spherical aberration (LSA) and astigmatism plots (FIGS. 4A and 4B) is shown referenced to the paraxial focus at 546.1 nm. Since the image is cylindrically curved, we choose to reference the vertical axis of the astigmatism plot to an average curvature of the image format. For simplicity, we choose the best fit radius to the corner of the image format for our reference. For this second embodiment, the shape of the image format (16.7×30 mm) gives us a multiplying factor of 1.3099 for the best fit radius to the corner of the format. Using this with the −120 mm cylinder radius, we get a best fit corner radius of −157.19 mm. All of the aberrations shown which are dependent on field are referenced to this best fit radius.

Figure 4C:
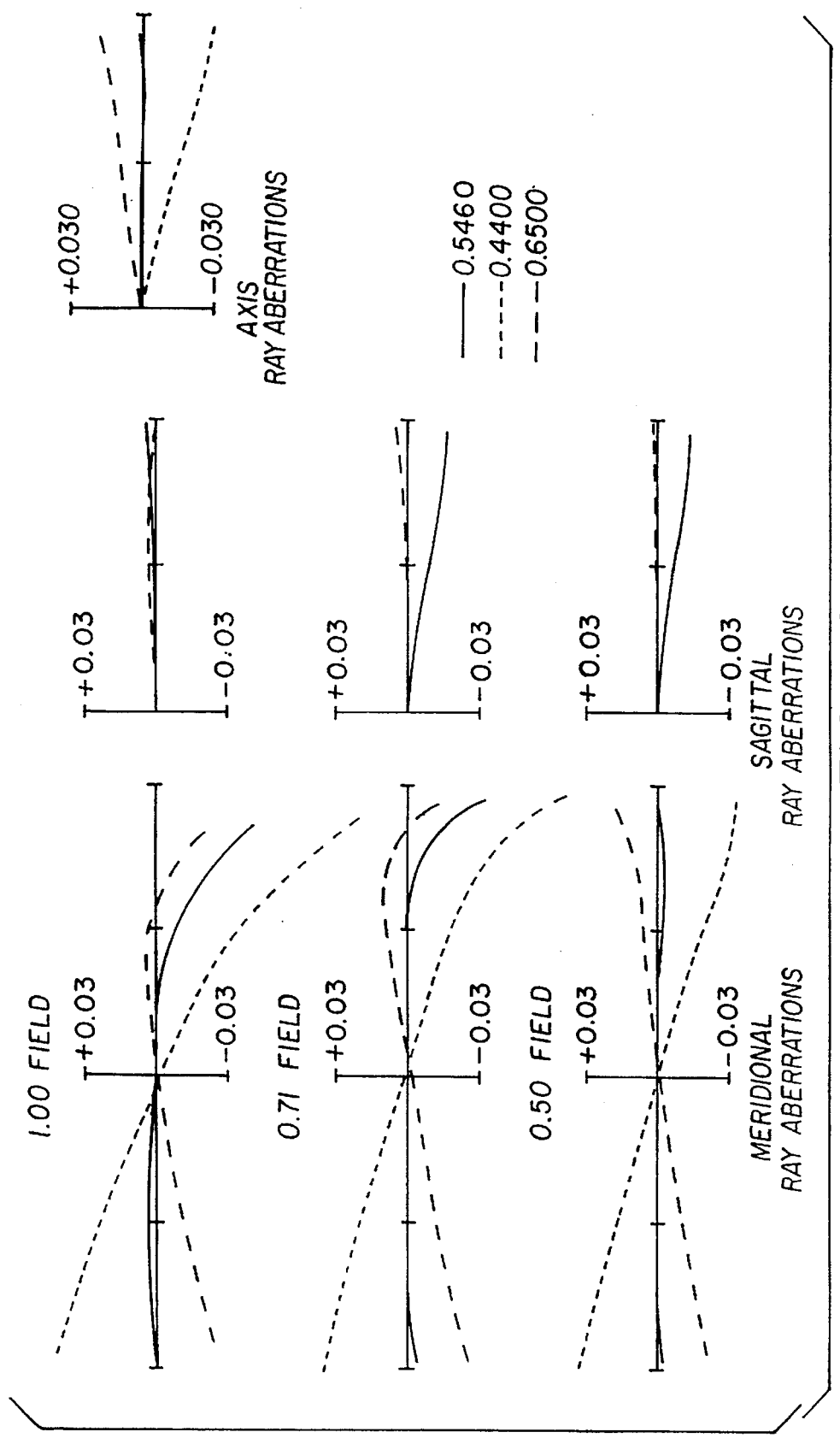

FIG. 4C depicts ray intercept curves for the second embodiment at several relative field positions (i.e. axis, 0.5, 0.7, and full field). The vertical axis depicts ray aberrations in millimeters. The horizontal axis is relative pupil coordinate, the edges being ±full pupil (i.e. ±1.0 pupil).

FIG. 4D depicts the lateral color (440 nm to 650 nm) across the field.

FIG. 4E depicts the distortion at the primary wavelength (546.1 nm) across the field.

Figure 4F:
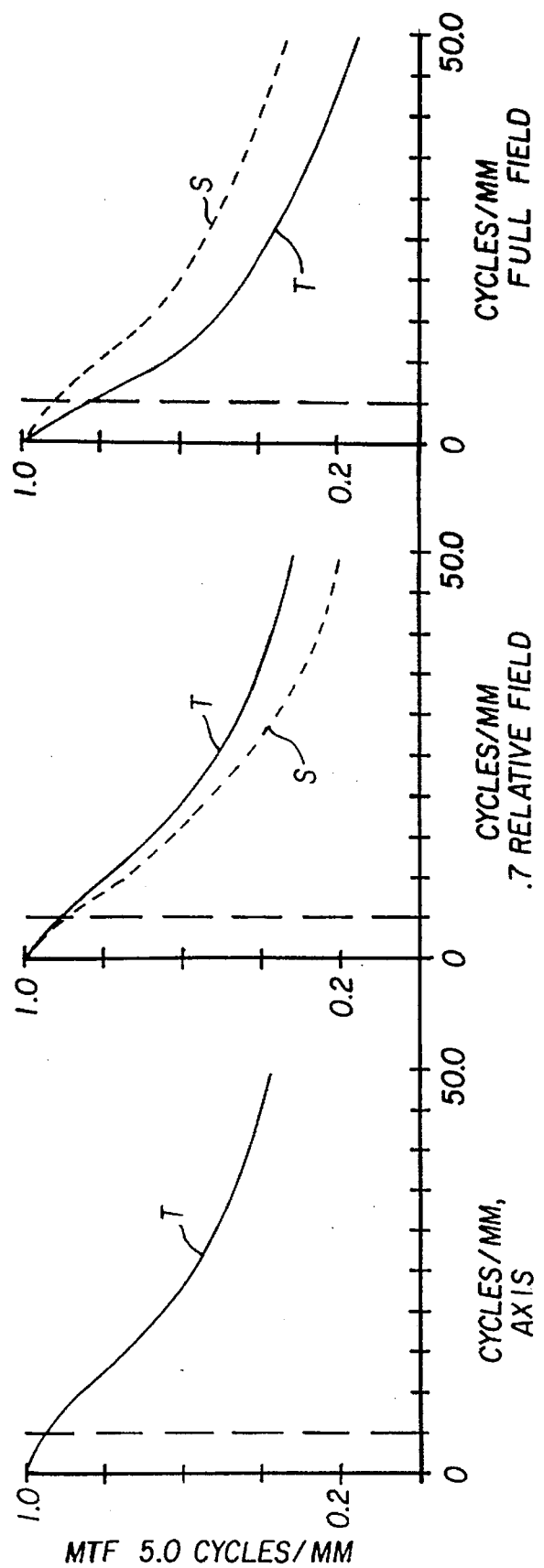

FIG. 4F depicts heterochromatic through frequency MTF at three field points: axis, 0.7 relative field, and full field. Wavelengths used were 650 nm, 546.1 nm, and 440 nm with respective chromatic weights of 35, 50, and 15.

Figure 5:
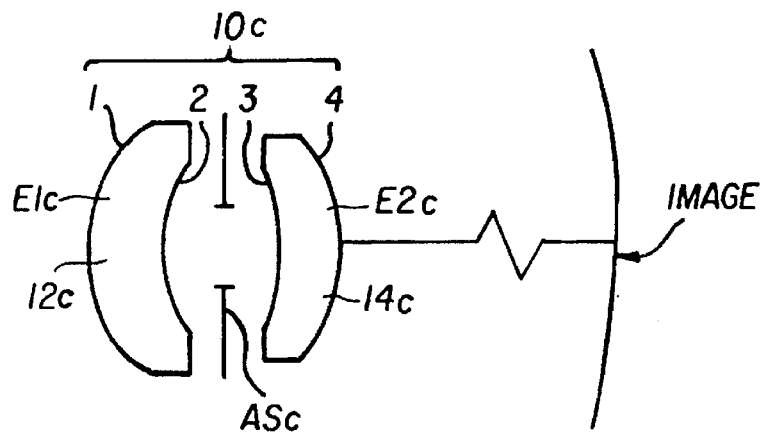
FIG. 5 shows the outline of the lens system 10c of a third preferred embodiment.

The third preferred embodiment is illustrated in FIG. 5. The front lens component 12c of the optical system 10i is a positive power meniscus lens element $E_{1c}$ which is a glass lens element. The rear lens component 14c is a meniscus plastic lens element $E_{2c}$. The rear lens component 12c is biaspheric and has negative optical power. The aperture stop ASc is located in the airspace formed between the first lens element $E_{1c}$ and the second lens element $E_{2c}$. In this third embodiment, the focal length of optical system 10c is 28 mm, the F-number is 8 and the full field of view is 62.92 degrees.

The lens system of the third embodiment is athermalized. That is, that a 30° C. temperature change produces only a minimum (i.e. −0.02 mm) image distance shift. A minimum image shift is defined as an image shift of less than |0.05|mm. This property was achieved by making a stronger lens element out of glass and a weak lens element out of plastic. Because the plastic lens element has strongly curved surfaces which are also aspheric, it contributes strongly to aberration control, but has essentially no effect on the image shift when the lens system temperature undergoes a large change.

In this third embodiment, the lens components 12c and 14c have the thickness of 3.33 mm and 2.92 mm respectively.

The image surface of the lens system 10c is cylindrical with a sag in the long dimension of the image. In this embodiment, this cylindrical radius of curvature is −120 mm.

Aspheric surfaces with about 98 waves and 209 waves departure from the best fit sphere, are used on the first and the second surfaces, respectively, of the biaspheric lens element to control the image quality.

The ratio of the total length TL of the lens system (measuring from the front-most surface's vertex to the image plane) to the effective focal length (EFL) of the lens system is 1.05.

The aberration curves illustrating the performance of the optical system of the third preferred embodiment are provided in FIGS. 6A–6F.

Figure 6A:
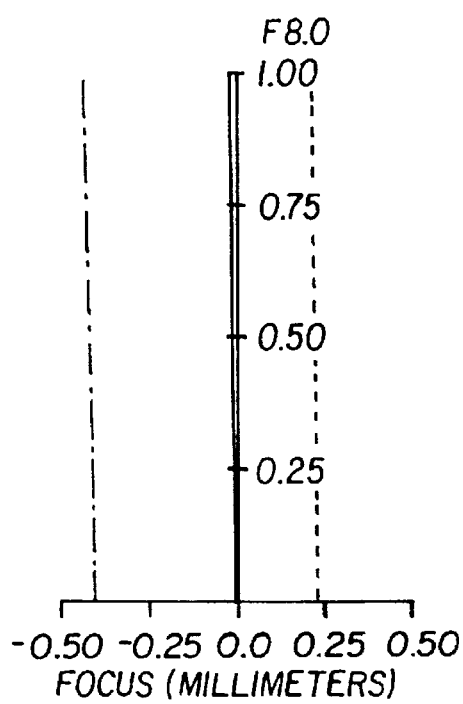
FIGS. 6A-6F provide aberration curves for the lens system 10c illustrated in FIG. 5.

More specifically, FIG. 6A illustrates longitudinal spherical aberration. The vertical axis depicts relative aperture. The horizontal axis depicts the focus position. The primary wavelength is 546.1 nm.

Figure 6B:
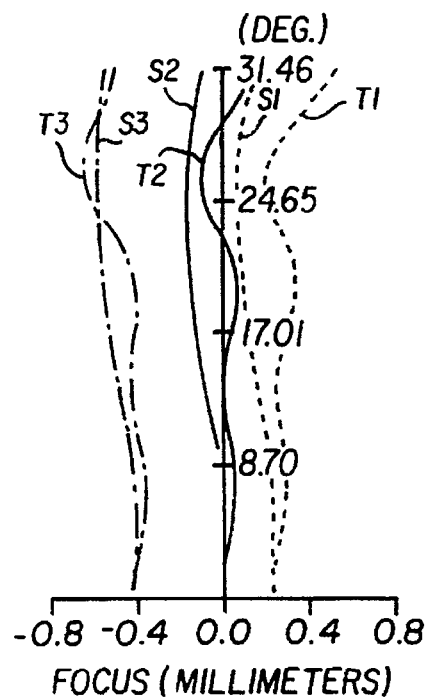

FIG. 6B illustrates astigmatism in the lens system. The vertical axis is the half field angle in degrees. The horizontal axis is focus position.

The "zero focus" on the horizontal axis of the longitudinal spherical aberration (LSA) and astigmatism plots (FIGS. 6A and 6B) is shown referenced to the paraxial focus at 546.1 nm. Since the image is cylindrically curved, we choose to reference the vertical axis of the astigmatism plot to an average curvature of the image format. For simplicity, we choose the best fit radius to the corner of the image format for our reference. For this third embodiment, the shape of the image format (16.7×30 mm) gives us a multiplying factor of 1.3099 for the best fit radius to the corner of the format. Using this with the −120 mm cylinder radius, we get a best fit corner radius of −157.19 mm. All of the aberrations shown which are dependent on field are referenced to this best fit radius.

Figure 6C:
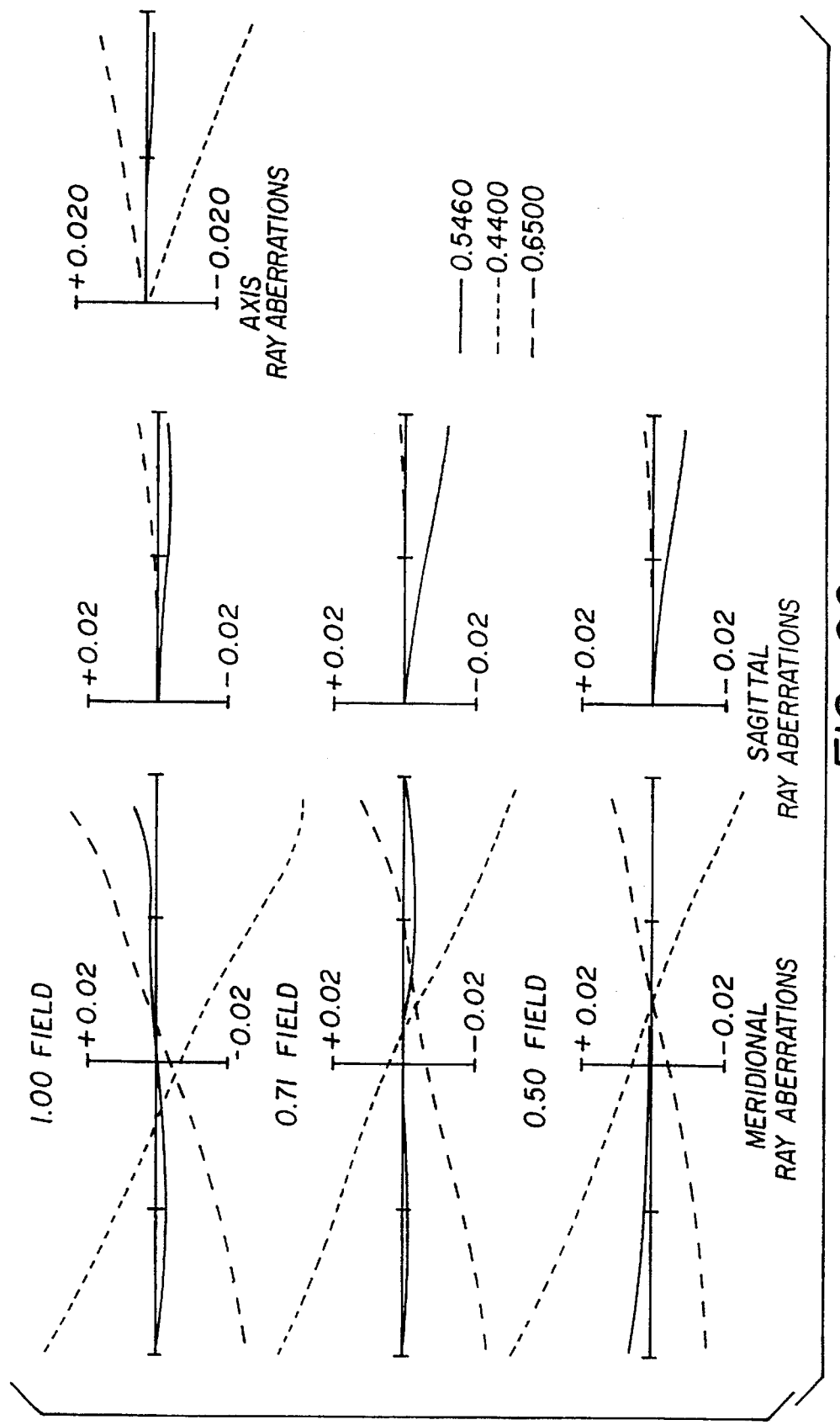

FIG. 6C depicts ray intercept curves for the third embodiment at several relative field positions (i.e. axis, 0.5, 0.7, and 1.0). The vertical axis depicts ray aberrations in millimeters. The horizontal axis is relative pupil coordinate, the edges being ±full pupil (i.e. ±1.0 pupil).

Figure 6D:
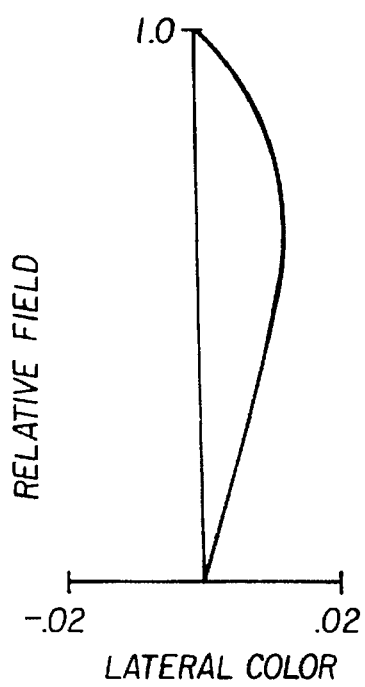

FIG. 6D depicts the lateral color (440 nm to 650 mm) across the field.

Figure 6E:
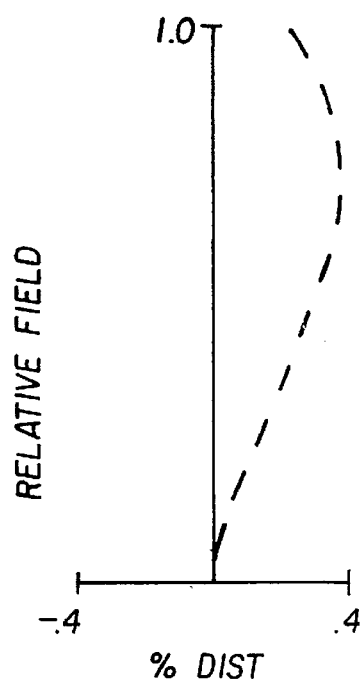

FIG. 6E depicts the distortion at the primary wavelength (546.1 nm) across the field.

Figure 6F:
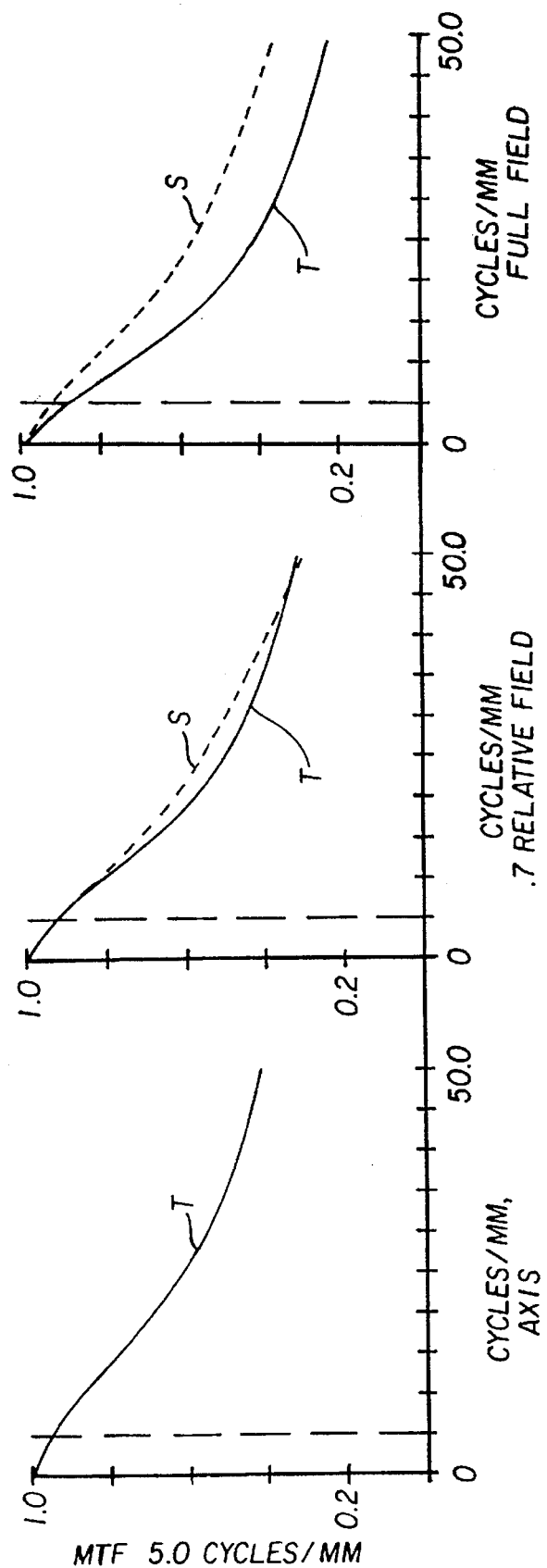

FIG. 6F depicts heterochromatic through frequency MTF at three field points: axis, 0.7 relative field, and full field. Wavelengths used were 650 nm, 546.1 nm, and 440 nm with respective chromatic weights of 35, 50, and 15.

The following summarizes some of the most pertinent performance characteristics of the first, second, and third embodiments.

SPHERICAL ABERRATION (LSA)

LSA was calculated for each lens system at a wavelength of 546.1 nm.

| Embodiment Number | F-Number | Amount of Spherical Aberration | Number of Aspheres |
|---|---|---|---|
| 1st | 8.0 | .111 mm | 2 |
| 2nd | 8.0 | .075 mm | 3 |
| 3rd | 8.0 | .024 mm | 2 |

ASTIGMATISM
AMOUNT OF ASTIGMATISM*

| RELF | 1st Embodiment | 2nd Embodiment | 3rd Embodiment |
|---|---|---|---|
| 0 | 0 | 0 | 0 |
| .1 | .00 mm | .01 mm | .03 mm |
| .2 | .01 mm | .04 mm | .06 mm |
| .3 | .08 mm | .08 mm | .06 mm |
| .4 | .23 mm | .12 mm | .07 mm |
| .5 | .40 mm | .16 mm | .15 mm |
| .6 | .50 mm | .20 mm | .21 mm |
| .7 | .51 mm | .24 mm | .14 mm |
| .8 | .51 mm** | .28 mm** | .06 mm |
| .9 | .51 mm | .14 mm | .15 mm |
| 1.0 | .12 mm | .15 mm | .22 mm** |

*The amount of astigmatism is measured for each lens at a wavelength of 546.1 nm. These embodiments have an F-number at F/8. RELF means relative field.
**Indicates the worst astigmatism point in each lens.

LATERAL COLOR

Numbers shown below are the maximums for 440 nm to 650 nm. The maximum lateral color does not always occur at the edge of the field.

| Embodiment Number | Amount of Lateral Color | |
|---|---|---|
| 1st | .0079 mm | (maximum is at .6 relative field) |
| 2nd | .0075 mm | (maximum is at .9 relative field) |
| 3rd | .0121 mm | (maximum is at .7 relative field) |

MTF ANALYSIS
MTF AT 5 LINES PER MILLIMETER*
(TANGENTIAL/SAGITTAL)

| Embodiment Number | F/Number | Axis | .7 Rel. Field | 1.0 Rel. Field | Full Field Angle |
|---|---|---|---|---|---|
| 1st | 8.0 | 94.9 | 92.6/90.1 | 89.1/91.6 | ±35.8 DEG. |
| 2nd | 8.0 | 94.6 | 92.0/90.6 | 82.9/92.6 | ±35.2 DEG. |
| 3rd | 8.0 | 95.1 | 92.5/93.1 | 89.7/93.7 | ±31.5 DEG. |

MTF AT 20 LINES PER MILLIMETER*
(TANGENTIAL/SAGITTAL)

| | | | | | |
|---|---|---|---|---|---|
| 1st | 8.0 | 67.5 | 56.3/45.8 | 50.1/56.2 | ±35.8 DEG. |
| 2nd | 8.0 | 64.8 | 58.5/52.4 | 41.7/59.4 | ±35.2 DEG. |
| 3rd | 8.0 | 68.9 | 57.2/61.9 | 49.0/64.4 | ±31.5 DEG. |

*Heterochromatic MTF at best focus wavelengths/weights used are 546.1 nm/50, 440 nm/15, and 650 nm/35.

The following (Tables 1–3) are the numerical examples of embodiments 1 through 3:

TABLE 1

| Surface | Clear Aperture | Axial Beam | Radius | Thickness | Index $N_d$ | V-Number $V_d$ |
|---|---|---|---|---|---|---|
| 1 | 8.11 | 3.00 | ASPHERE | 2.850 | 1.492 | 57.4 |
| 2 | 5.03 | 2.60 | ASPHERE | 1.700 | | |
| | 2.55 | 2.55 | DIAPHRAGM | 1.764 | | |
| 3 | 5.12 | 2.50 | −7.93827 | 2.000 | 1.492 | 57.4 |
| 4 | 6.83 | 2.66 | −5.37793 | | | |

LENS LENGTH 8.314

Where the radius of curvature for a surface, the axial thickness and air separations are measured in millimeters.

Aspheric Equation:

$$X = \frac{CY^2}{1 + \sqrt{1 - (k+1)C^2Y^2}} + DY^4 + EY^6 + FY^8 + GY^{10} + HY^{12} + IY^{14} + JY^{16} + KY^{18}$$

Surf. 1　　C = 0.1375124　　　D = 0.2975986E−03　　H = −0.5338952E−08
　　　　　 k = 0.9855269　　　 E = −0.1802293E−04　 I = 0.7213138E−09
　　　　　　　　　　　　　　　　F = 0.5067433E−05　　J = 0.3634665E−10
　　　　　　　　　　　　　　　　G = −0.2582161E−06　 K = −0.2374518E−11

VERTEX RADIUS (1/C) = 7.27207

TABLE 1-continued

| Surf. 2 | C = 0.1292569 | D = 0.1026159E-02 | H = 0.1958292E-05 |
|---|---|---|---|
| | k = 2.5571032 | E = 0.2197372E-03 | I = -0.2254705E-06 |
| | | F = -0.3899092E-04 | J = 0. |
| | | G = 0.5965716E-06 | K = 0. |

VERTEX RADIUS (1/C) = 7.73653

Notes:

1. 
   - EF = 24.00
   - Semi-Field = 35.84 Deg.
   - Semi-Diag. = 17.17
   - Format = 16.7 × 30.0
   - F/No. = F/ 8.00
   - BF = 21.12
   - FF = 18.43
   - Best Focus = -.11

Principal wavelength is 546 nm, achromatism: 440–650 nm.
   The plastic material having index $N_d$ and Abbe V-number of 1.492 and 57.4, respectively.

| Wavelength (Microns) | Refractive Index |
|---|---|
| 0.65000000 | 1.489394 |
| 0.54610000 | 1.493777 |
| 0.44000000 | 1.502120 |

2. Image surface is a cylinder with radius -90. Long dimension of image format is measured along cylinder radius of curvature.

| Image Height | Angular Field | Max. Aper. With No. Vignetting |
|---|---|---|
| 5.69 | 13.41 | F/ 8.0 |
| 12.00 | 26.82 | F/ 8.0 |
| 17.17 | 35.84 | F/ 8.0 |

| Pupil | Location | Diameter |
|---|---|---|
| Entrance | 4.49 | 3.00 |
| Exit | -4.01 | 3.14 |

3. MTF data is at best focus along the diagonal of the above image format using wavelengths 650, 546.1, and 440 nm, with respective weights .35, .5, and .15:

Nominal lens system.

| | | | Percent Field (Sagittal/Tangential) | | | | | |
|---|---|---|---|---|---|---|---|---|
| F/No. | L/MM | Axis | 38% | 57% | 71% | 86% | 95% | 100% |
| 8.0 | 7. | 92 | 91/91 | 87/89 | 84/88 | 83/82 | 85/83 | 87/83 |
| 8.0 | 12.5 | 82 | 80/79 | 71/76 | 65/74 | 64/69 | 68/69 | 72/68 |
| 8.0 | 22. | 64 | 64/57 | 52/52 | 43/51 | 42/50 | 48/50 | 53/46 |

The lens system MTF with the lens system having a +.025 mm decenter on surface 1.

| 8.0 | 7. | 92/92 | 90/91 | 85/89 | 82/85 | 80/74 | 83/73 | 85/78 |
| 8.0 | 12.5 | 82/81 | 79/79 | 68/76 | 60/72 | 58/60 | 63/52 | 68/57 |

The lens system MTF with the lens system having a -.025 mm decenter on surface 1.

| 8.0 | 7. | 92/92 | 91/89 | 88/85 | 86/82 | 86/80 | 87/80 | 88/78 |
| 8.0 | 12.5 | 82/81 | 80/73 | 74/65 | 69/58 | 69/57 | 72/58 | 74/53 |

TABLE 2

| Surface | Clear Aperture | Axial Beam | Radius | Thickness | Index $N_d$ | V-Number $V_d$ |
|---|---|---|---|---|---|---|
| 1 | 7.80 | 3.00 | ASPHEREcwued 05627684.61 | 2.850 | 1.492 | 57.4 |
| 2 | 5.23 | 2.51 | 9.94649 | 1.517 | | |
| | 2.31 | 2.31 | DIAPHRAGM | 1.883 | | |
| 3 | 4.88 | 2.05 | ASPHERE | 2.500 | 1.590 | 30.9 |
| 4 | 7.74 | 2.17 | ASPHERE | | | |

LENS LENGTH 8.750

Where the radius of curvature for a surface, the axial thickness and air separations are measured in millimeters.

Aspheric Equation:

$$X = \frac{CY^2}{1 + \sqrt{1 - (k+1)C^2Y^2}} + DY^4 + EY^6 + FY^8 + GY^{10} + HY^{12} + IY^{14} + JY^{16} + KY^{18}$$

| Surf. 1 | C = 0.1748686 | D = 0. | H = 0. |
|---|---|---|---|
| | k = 0.1739281 | E = 0. | I = 0. |
| | | F = 0. | J = 0. |

TABLE 2-continued

|  |  | G = 0. | K = 0. |
|---|---|---|---|
|  |  | VERTEX RADIUS (1/C) = 5.71858 |  |
| Surf. 3 | C = −0.1667150 | D = −0.1173103E-02 | H = −0.1248107E-05 |
|  | k = 0.7696216 | E = −0.2937716E-03 | I = 0.4331939E-07 |
|  |  | F = 0.4321027E-04 | J = 0.3983943E-07 |
|  |  | G = −0.4805751E-05 | K = −0.3217884E-08 |
|  |  | VERTEX RADIUS (1/C) = −5.99826 |  |
| Surf. 4 | C = −0.1508910 | D = −0.1622863E-03 | H = 0.1499098E-07 |
|  | k = 0.5900456 | E = −0.2936541E-04 | I = −0.4056008E-09 |
|  |  | F = 0.9085097E-06 | J = −0.7309910E-10 |
|  |  | G = −0.1776793E-06 | K = 0.3466098E-11 |
|  |  | VERTEX RADIUS (1/C) −6.62730 |  |

Notes:

1. EF = 24.00     F/No. = F/ 8.00
   Semi-Field = 35.15 Deg.     BF = 17.24
   Semi-Diag. = 17.17     FF = 21.96
   Format = 16.7 × 30.0     Best Focus = −.07

Principal wavelength is 546 nm, achromatism: 440–650 nm.
The plastic material having index $N_d$ and Abbe V-number of
1.492 and 57.4, respectively.

| Wavelength (Microns) | Refractive Index |
|---|---|
| 0.65000000 | 1.489394 |
| 0.54610000 | 1.493777 |
| 0.44000000 | 1.502120 |

The plastic material having index $N_d$ and Abbe V-number of
1.590 and 30.9, respectively.

| Wavelength (Microns) | Refractive Index |
|---|---|
| 0.65000000 | 1.585337 |
| 0.54610000 | 1.594949 |
| 0.44000000 | 1.614252 |

2. Image surface is a cylinder with radius −120. Long dimension of
image format is measured along cylinder radius of curvature.

| Image Height | Angular Field | Max. Aper. With No. Vignetting |
|---|---|---|
| 5.59 | 13.12 | F/ 8.0 |
| 11.93 | 26.24 | F/ 8.0 |
| 17.17 | 35.15 | F/ 8.0 |

| Pupil | Location | Diameter |
|---|---|---|
| Entrance | 4.65 | 3.01 |
| Exit | −4.40 | 2.71 |

3. MTF data is at best focus along the diagonal of the above
image format using wavelengths 650, 546.1, and 440 nm,
with respective weights .35, .5, and .15.
This lens formula was designed to have minimum MTF image
degradation for a 0.025 mm shift of the first surface on the
biaspheric element relative to the second surface of the
biaspheric element.

Nominal lens system.

|  |  |  | Percent Field (Sagittal/Tangential) |  |  |  |  |  |
|---|---|---|---|---|---|---|---|---|
| F/No. | L/MM | Axis | 38% | 57% | 71% | 86% | 95% | 100% |
| 8.0 | 7. | 92 | 90/91 | 87/90 | 86/88 | 88/79 | 89/71 | 90/79 |
| 8.0 | 12.5 | 81 | 79/80 | 72/78 | 70/75 | 73/63 | 77/52 | 78/61 |
| 8.0 | 22. | 64 | 64/62 | 54/60 | 51/56 | 56/44 | 60/36 | 60/44 |
| Perturbed lens system with +.025 mm decenter on surface 3. | | | | | | | | |
| 8.0 | 7. | 92/91 | 90/90 | 86/88 | 85/86 | 86/74 | 88/66 | 89/75 |
| 8.0 | 12.5 | 81/80 | 78/79 | 70/75 | 67/73 | 71/58 | 76/46 | 78/55 |
| Perturbed lens system with −.025 mm decenter on surface 3. | | | | | | | | |
| 8.0 | 7. | 92/91 | 90/90 | 88/89 | 87/86 | 88/80 | 90/73 | 90/80 |
| 8.0 | 12.5 | 81/80 | 79/78 | 73/75 | 72/69 | 75/61 | 77/54 | 77/61 |

TABLE 3

| Surface | Clear Aperture | Axial Beam | Radius | Thickness | Index $N_d$ | V-Number $V_d$ |
|---|---|---|---|---|---|---|
| 1 | 9.98 | 3.50 | 6.57522 | 3.330 | 1.498 | 67.0 |
| 2 | 7.49 | 2.92 | 12.3004 | 2.812 | | |
| | 2.50 | 2.50 | DIAPHRAGM | 2.852 | | |
| 3 | 5.94 | 2.07 | ASPHERE | 2.920 | 1.590 | 30.9 |
| 4 | 9.24 | 2.18 | ASPHERE | | | |

LENS LENGTH = 11.914

- Where the radius of curvature for a surface, the axial thickness and air separations are measured in millimeters.
- The front element is BK10 glass. The second element is polystyrene.
- A plus 30 degree celsius temperature change causes a −.02 mm image distance change. The thermal expansion and refractive index coefficients used for BK10 are 5.8E−06 mm per mm per degree celsius and 3.5E−06 per degree celsius, respectively. The thermal expansion and refractive index coefficients used for polystyrene are 7.2E−05 mm per mm per degree celsius and −13E−05 per degree celsius, respectively.

Aspheric Equation:

$$X = \frac{CY^2}{1 + \sqrt{1-(k+1)C^2Y^2}} + DY^4 + EY^6 + FY^8 + GY^{10} + HY^{12} + IY^{14}$$

Surf. 3  C = −0.1639393    D = −0.1352420E-02    G = −0.1386870E-05
         k = 0.            E = −0.1164530E-03    H = −0.1526140E-07
                           F = 0.7685150E-05     I = 0.
         VERTEX RADIUS (1/C) = −6.09982

Surf. 4  C = −0.1388098    D = −0.6652480E-03    G = −0.4537740E-06
         k = −1.           E = −0.4647250E-04    H = 0.1959480E-07
                           F = 0.4762720E-05     I = −0.3859810E-09
         VERTEX RADIUS (1/C) = −7.2041

Notes:

1. EF = 28.00                F/No. = F/ 8.00
   Semi-Field = 31.46 Deg.   BF = 17.38
   Semi-Diag. = 17.17        FF = 25.96
   Format = 16.7 × 30.0      Best Focus = +.00

Principal wavelength is 546 nm, achromatism: 440–650 nm.
   The plastic material having index $N_d$ and Abbe V-number of 1.492 and 57.4, respectively.

| Wavelength (Microns) | Refractive Index |
|---|---|
| 0.65000000 | 1.489394 |
| 0.54610000 | 1.493777 |
| 0.44000000 | 1.502120 |

The plastic material having index $N_d$ and Abbe V-number of 1.590 and 30.9, respectively.

| Wavelength (Microns) | Refractive Index |
|---|---|
| 0.65000000 | 1.585337 |
| 0.54610000 | 1.594949 |
| 0.44000000 | 1.614252 |

2. Image surface is a cylinder with radius −120. Long dimension of image format is measured along cylinder radius of curvature.

| Image Height | Angular Field | Max. Aper. With No. Vignetting |
|---|---|---|
| 5.75 | 11.59 | F/ 8.0 |
| 12.04 | 23.18 | F/ 8.0 |
| 17.17 | 31.46 | F/ 8.0 |

| Pupil | Location | Diameter |
|---|---|---|
| Entrance | 7.42 | 3.51 |
| Exit | −6.11 | 2.94 |

3. MTF data is at best focus along the diagonal of the above image format using wavelengths 650, 546.1, and 440 nm, with respective weights .35, .5, and .15.
   This lens formula was designed to have minimum MTF image degradation for a 0.025 mm shift of the first surface on the biaspheric element relative to the second surface of the biaspheric element.

TABLE 3-continued

Nominal lens system.

| F/No. | L/MM | Axis | Percent Field (Sagittal/Tangential) | | | | | |
|---|---|---|---|---|---|---|---|---|
| | | | 38% | 57% | 71% | 86% | 95% | 100% |
| 8.0 | 7. | 92 | 91/91 | 90/89 | 89/88 | 90/86 | 90/84 | 90/84 |
| 8.0 | 12.5 | 83 | 81/80 | 78/76 | 77/74 | 77/71 | 78/69 | 80/66 |
| 8.0 | 22. | 66 | 66/62 | 61/57 | 60/54 | 61/52 | 62/50 | 62/44 |
| Perturbed lens system with +.025 mm decenter on surface 3. | | | | | | | | |
| 8.0 | 7 | 92/92 | 91/90 | 89/88 | 88/86 | 88/82 | 88/79 | 89/82 |
| 8.0 | 12.5 | 82/82 | 80/79 | 76/74 | 74/69 | 74/65 | 75/62 | 77/67 |
| Perturbed lens system with −.025 mm decenter on surface 3. | | | | | | | | |
| 8.0 | 7. | 92/92 | 92/90 | 90/87 | 90/85 | 90/83 | 90/81 | 90/77 |
| 8.0 | 12.5 | 82/82 | 81/77 | 79/71 | 78/67 | 79/61 | 79/59 | 79/51 |

As stated above, without a desensitizing procedure, similar to the one discussed above, the biaspheric element would most likely be difficult to make and therefore be much more expensive to produce.

It is also to be understood that other embodiments of the present invention may include lens systems having less or more than two lens elements or components. The desensitizing procedure described above can be used to desensitize any type of a lens system having a plurality of aspheric surfaces and to lens systems having biaspheric lens components.

Optical systems in accordance with the present invention are particularly well suited for use in cameras.

Variations and modifications within the scope of the invention will undoubtedly suggest themselves to those skilled in the art. Accordingly, the foregoing description should be taken as illustrative and not in a limiting sense. Thus, the invention has been described in detail with particular reference to a preferred embodiment thereof, but it will be understood that variations and modifications can be effected within the spirit and scope of the invention.

What is claimed is:

1. A method of making a desensitized lens system having nominal lens system parameters, said method comprising in order, the steps of:

i) obtaining a starting point lens design having a plurality of aspheric surfaces, each of said aspheric surfaces characterized by surface parameters;

ii) decentering said surface parameters of one of the aspheric surfaces of said lens system;

iii) optimizing the starting point lens design with the decentered surface parameters, said optimising includes running an optimization routine of a lens design program and utilizing both positive and negative field rays to come up with optimum surface parameters for aspheric surfaces;

iv) undecentering previously decentered surface parameters when the optimization is complete to obtain the nominal lens system parameters; and v) manufacturing the lens system according to said nominal lens system parameters.

2. A method of making a desensitized lens system with a biaspheric lens component, said desensitized lens system having nominal lens system parameters, said method comprising in order, the steps of:

i) obtaining a starting point lens design having a biaspheric lens component characterized by surface parameters;

ii) decentering the surface parameters of one of the aspheric surfaces of said lens component;

iii) optimizing the lens design with the decentered surface parameters, said optimising includes running an optimization routine of a lens design program and utilizing both positive and negative field rays to come up with optimum parameters for aspheric surfaces;

iv) undecentering previously decentered surface parameters when the optimization is complete to obtain the nominal lens system parameters; and v) manufacturing the lens system according to said nominal lens system parameters.

3. A lens system made by the method of claim 1, said lens system comprising a plurality of aspheric surfaces.

4. A lens system made by the method of claim 1, said lens system comprising a biaspheric lens element.

5. A lens system made by the method of claim 2, said lens system component.

6. A two lens component lens system made by the method of claim 1.

7. A lens system made by the method of claim 2, said lens system comprising two lens elements, wherein one of said lens elements is biaspheric.

8. A lens system made by the method of claim 2 and consisting of a biaspheric lens component.

9. A method of making a lens system having nominal lens system parameters, said method utilizing a programmed digital computer which includes a) means for optimizing a lens system having aspheric surfaces, and b) means for decentering aspheric surfaces; and said method comprising in order, the steps of:

i) obtaining a starting point lens design having a biaspheric lens component characterized surface parameters;

ii) decentering the surface parameters of one of the aspheric surfaces of said lens component;

iii) utilizing said means for optimizing to optimize the lens design with the decentered surface parameters utilizing both positive and negative field rays to come up with optimum parameters for aspheric surfaces;

iv) utilizing said means for decentering to undecenter previously decentered surface parameters when the optimization is complete to obtain the nominal lens system parameters; and v) manufacturing the lens system according to said nominal lens system parameters.

10. A method of making a lens system having nominal lens system parameters, said method utilizing a programmed digital computer, which includes a) means for optimizing a lens system having aspheric surfaces, and b) means for decentering aspheric surfaces; and said method comprising in order, the steps of:

i) obtaining a starting point lens design having a plurality of aspheric surfaces, each of said surfaces characterized by surface parameters;

ii) utilizing said means for decentering to decenter the surface parameters of one of the aspheric surfaces of said lens element;

iii) utilizing said means for optimizing to optimize the lens design with the decentered surface parameters utilizing both positive and negative field rays to come up with optimum parameters for aspheric surfaces;

iv) utilizing said means for decentering to undecenter previously decentered surface parameters when the optimization is complete to obtain the nominal lens system parameters; and v) manufacturing the lens system according to said nominal lens system parameters.

* * * * *